Dec. 16, 1958  H. WIEDEMANN  2,864,170
PLANIMETER
Filed Dec. 10, 1954
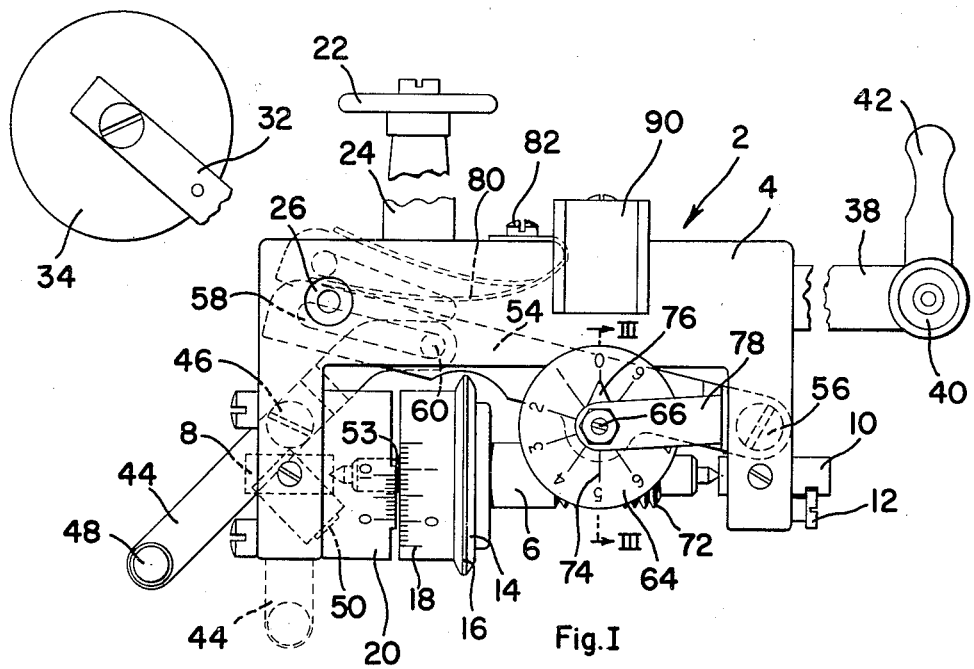
Fig. I
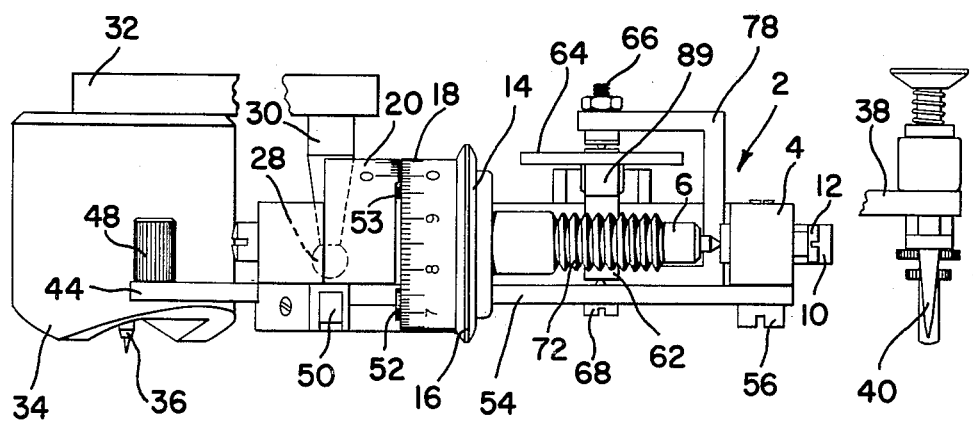
Fig. II
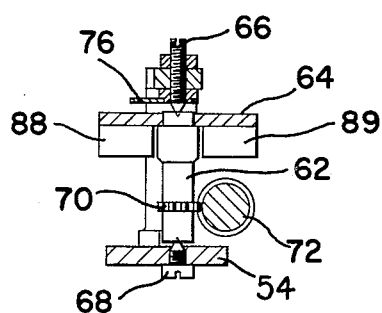
Fig. III
INVENTOR.
HANS WIEDEMANN
BY
ATTORNEY

# United States Patent Office 2,864,170
Patented Dec. 16, 1958

2,864,170

PLANIMETER

Hans Wiedemann, Bloomfield, N. J., assignor to Keuffel & Esser Company, Hoboken, N. J., a corporation of New Jersey Application December 10, 1954, Serial No. 474,376

5 Claims. (Cl. 33—122)

This invention relates to a zero setting device for a planimeter.

A planimeter is a device for measuring areas on drawings, maps, graphs and the like. It is conventionally made up of a pole arm, carriage and a tracer arm. The pole is at one end of the pole arm and is provided with a point which can be inserted in the paper of the drawing, map, etc. and is provided with a weight to hold it in position. The other end of the pole arm pivots in the carriage. The tracer arm is fixed to the carriage and extends therefrom. It is provided with a tracer point or lens for following the outline of the area to be measured. A measuring wheel rotates about a horizontal axle pivoted in the carriage. This axle is parallel to the tracer arm so that the measuring wheel rotates in a plane perpendicular to the tracer arm. Thus when the carriage is moved over the paper in a direction parallel to the tracer arm, the measuring wheel slides over the paper without rotating. When the carriage is moved perpendicular to the tracer arm, the measuring wheel rotates. A guide wheel is also provided which rotates in a plane parallel to the tracer arm. The action of the guide wheel is opposite to the action of the measuring wheel; i. e., it rotates when the carriage is moved parallel to the tracer arm and slides when the carriage is moved perpendicular to the tracer arm. In making either exactly parallel to or perpenvery seldom moved either exactly parallel to or perpendicular to the tracer arm so that both wheels slide and rotate to some extent.

The measuring wheel is provided with graduations which give a reading proportional to the area enclosed by the motion of the tracer provided at the end of the tracer arm. For example, the measuring wheel may be divided into 100 divisions. A vernier may also be provided for reading the measuring wheel which may be divided into 10 divisions. Thus one division on the measuring wheel equals 10 venier units and a complete revolution of the measuring wheel equals 1000 vernier units. A dial may also be provided to indicate the number of turns of the measuring wheel. The motion of the dial is geared to the motion of the measuring wheel, for example, by means of a worm gear provided on the measuring wheel axle and a pinion gear on the shaft which pivots the dial for rotation. This shaft is normally vertical. The dial may have graduations which indicate up to 10 revolutions of the measuring wheel so that one revolution of the dial would be equal to 10,000 vernier units.

It is a common practice in measuring an area with the planimeter to make a mark on the outline of the area to be measured, place the tracer on this mark and record the reading of the dial, measuring wheel and vernier, in vernier units. The tracer is then made to follow the outline of the area until it returns to the mark after having enclosed the complete area. The second reading of the dial, measuring wheel and vernier is then made in vernier units. The difference between these two readings is proportional to the area enclosed by the tracer and the actual area is obtained by multiplying by a factor. On some instruments, the tracer arm is adjustable to various lengths and is provided with a scale which is a measure of a length of the tracer arm. This adjustment of the tracer arm changes the factor which must be used in determining the actual area from the reading taken in vernier units.

The principal object of the present invention is to provide a planimeter with means for simultaneously setting the measuring wheel and dial to their zero positions so that measurements can begin from zero and it is not necessary to record two readings and obtain the difference when making a measurement.

The detailed construction of the new planimeter will be fully understood from the following description taken in connection with the accompanying drawing in which Fig. I is a view in horizontal plan of the planimeter, Fig. II is a view in vertical elevation of the planimeter and Fig. III is a view in partial sectional elevation taken along the line III—III of Fig. I and looking in the direction of the arrows.

The carriage 2 is made up primarily of a yoke 4 in the form of an inverted U. The axle 6 extends between the arms of the U. It ends are provided with pivot points which fit into the adjustable pivot bearings 8 and 10 mounted in the arms of the yoke 4. The screw 12 is provided for fine adjustment of the pivot bearing 10 in order to make the axle rotate freely but without "play." The measuring wheel 14 carried on the axle 6 is provided with a rim 16 having a rough ground edge to provide turning friction between the measuring wheel and the paper. The measuring wheel 14 is also provided with a graduated drum 18 having graduations extending around its circumference. The vernier 20 is mounted on the carriage yoke 4 adjacent to the measuring wheel 14 as shown. The guide wheel 22 is mounted for rotation on a post 24 extending from the base of the carriage yoke 4. The socket 26 (Fig. I) is provided in the carriage yoke to receive a ball 28 (Fig. II) provided at the lower end of a post 30 secured to one end of the pole arm 32. The other end of the pole arm 32 is secured to a weight 34 and a needle point 36 is provided at the bottom of the weight 34 to anchor the pole to the paper. In the present invention it is important that the socket 26 be low (near the paper) so that the pin 30 moves nearly vertically when the measuring wheel is lifted off the paper. With this construction there is very little tendency for the measuring wheel to turn as it is again lowered onto the paper.

The tracer arm 38 extends from the carriage yoke 4 and carries a tracer 40 which is in the form of a pin in the embodiment shown. A finger grip 42 pivoted about the tracer pin may also be provided as shown.

A lever arm 44 is pivoted to the underside of the carriage yoke 4 at 46. One end of this arm is provided with a knurled knob 48 for thum operation. A small permanent magnet 50 is carried on this arm. When this lever arm 44 is pivoted to a position perpendicular to the base of the carriage yoke 4, as shown in dotted lines the permanent magnet 50 approaches a permanent magnet 52 carried on the measuring wheel. The coaction of these two permanent magnets turns the measuring wheel to its zero position about the axle 6. For this purpose, the permanent magnets 50 and 52 are mounted so that unlike poles will approach each other causing an attraction. Another permanent magnet 53 is mounted 180° opposite on the measuring wheel drum 18 but this magnet is mounted oppositely to the magnet 52 so that when the permanent magnet 50 is brought near it, the like poles will repel each other and swing the magnet 52 into the position closer to magnet 50. Although permanent magnets are provided on both the lever arm 44 and the measuring wheel 14 in the embodiment shown, it will be understood that as long as a magnet is used in one of these positions, it is possible to use an unmagnetized member; i. e. a magnetic substance such as steel or soft iron in the other position which will coact with the magnet to produce the desired result. However, it is preferred to use permanent magnets on both the lever 44 and the measuring wheel drum 18 and also to utilize the two permanent magnets on the measuring wheel drum 18 as shown and described. The other parts of the planimeter should be made of non-magnetic material, such as nickel, silver, brass, bronze and the like.

A second lever arm 54 is pivoted to the under side of the carriage yoke 4 at 56. The lever arm 54 is provided with a slot 58 which receives a pin 60 carried at one end of the lever arm 44. This pin and slot means enables the lever 44 to actuate the lever arm 54 so that when the lever arm 44 is pivoted to the position perpendicular to the carriage yoke 4 as shown in dotted lines, the lever arm 54 is moved away from the axle 6 to the position also partially shown in dotted lines. The lever arm 54 carries a shaft 62 (Figs. I and III) upon which the dial 64 rotates. Pivots 66 and 68 are provided for the shaft 62. The shaft 62 also carries pinion gear 70 (Fig. III) which engages the worm gear 72 carried on the axle 6 when the lever arm 54 is in its position nearest the axle 6. The dial 64 is provided with graduations 74 and a pointer 76 is provided adjacent to the graduations 74 but is fixed with respect to the yoke 78 provided on the lever arm 54. The pointer 76 and the graduations 74 indicate revolutions of the measuring wheel 14 when the pinion gear 70 and the worm gear 72 are engaged. A spring 80 is attached to the carriage yoke 4 by a screw 82 and its free end acts against the lever arm 54 to push it towards the axle 6 and hold pinion gear 70 and the worm gear 72 in engagement. However, when the lever arm 44 is in position perpendicular to the carriage yoke 4 as shown by dotted lines, it prevents the spring 80 from moving the lever arm 54 but as soon as knob 48 on the lever arm 44 is moved to the left, the spring 80 snaps the gears into engagement and also twists the lever arm 44 because of the pin and slide means 58 and 60 so that the permanent magnet 50 is pulled away from the measuring wheel 14. The motion of the lever arm 44 under the action of the spring 80 may be limited by the length of the slot 58 or by suitable stops provided on the lever arm 54.

A permanent magnet 88 is carried under the dial 64 on the shaft 62 which coacts with a permanent magnet 90 carried on the base of the carriage yoke 4 to turn the dial 64 to its zero position when the pinion gear 70 and the worm gear 72 are disengaged. To this end, permanent magnets 88 and 90 are mounted so that opposite poles will approach each other and attract. Preferably a second permanent magnet 89 is also provided on the dial 64, 180° opposite from the permanent magnet 88. The permanent magnet 89 is mounted with the opposite pole from the magnet 88 facing outward so that should it lie adjacent the permanent magnet 90 when the gears 70 and 72 are disengaged, the unlike poles will repel each other and the dial 64 will be turned about the shaft 62 to bring the magnet 88 adjacent the magnet 90. These two magnets will attract each other bringing the dial 64 to zero position.

As in the case of the magnetic members provided on the lever arm 44 and the measuring wheel drum 18, as long as a permanent magnet is used on either the yoke 4 or on the shaft 62, it is possible to use an unmagnetized magnetic member in the other position.

Readings are taken with the new planimeter in conventional manner except that before each reading the carriage is tilted upwards slightly to lift the rim 16 of the measuring wheel 14 off the paper and the lever arm 44 is pushed into its position perpendicular to the carriage yoke 4, as shown by dotted lines, by the knurled knob 48. This brings both the measuring wheel drum 18 and the dial 64 to their zero positions. The carriage is then lowered until the rim 16 of the measuring wheel 14 touches the paper and the knob 48 is pushed to the left so that the spring 80 brings the pinion gear 70 and the worm gear 72 into engagement. The tracer is then made to follow the outline of the area to be measured in the usual manner and the reading of the measuring wheel and dial when multiplied by the proper factor gives the required area.

Although it is preferred to provide two pairs of magnetic members for returning both the measuring wheel and the dial to the zero position, it is possible to provide only one pair of magnetic members for returning either one of these graduation bearing members to the zero position and to provide other means such as a cam for returning the other graduation bearing member to zero.

It is also possible to provide only one lever arm equivalent to the lever arm 54 and mount the magnet 50 in a fixed position equivalent to the position which it takes when the lever arm 44 is perpendicular to the base of the yoke 4. With this construction the measuring wheel 18 will be returned to its zero position by the coaction of the magnets 50 and 52 as soon as the gearing is disengaged. The dial 64 may then be returned to its zero position by the second pair of permanent magnets as shown or by a cam device. This embodiment has one disadvantage over the embodiment described in that the permanent magnets 50, 52 and 53 are always in a more or less active position with respect to each other and if the friction between the paper and the rim 16 of the measuring wheel is not sufficient, there might be some tendency for the measuring wheel to turn under the influence of the magnets giving a false reading.

Having thus described the invention what is claimed is:

1. In a planimeter having the conventional pole arm, guide wheel, measuring wheel, dial and tracer arm, the measuring wheel and dial being geared together so that the dial indicates the number of revolutions of the measuring wheel, the improvement comprising a pair of magnetic members at least one of which is a permanent magnet one of which is mounted on said measuring wheel and one of which is positionable to coact with the other, a second pair of magnetic members at least one of which is a permanent magnet one of which is mounted on said dial and one of which is positioned to coact with the other and means for simultaneously moving said dial to disconnect the gearing between said dial and said measuring wheel and to bring said magnetic member on said dial adjacent the other of said second pair of magnetic members to return said dial to zero position and for bringing said magnetic member which is positionable to coact with the magnetic member on said measuring wheel toward the magnetic member on said measuring wheel to turn said measuring wheel to zero position.

2. In a planimeter having the conventional pole arm, carriage, guide wheel, measuring wheel, dial and tracer arm, the measuring wheel and dial being geared together so that the dial indicates the number of revolutions of the measuring wheel, the improvement comprising a pair of magnetic members at least one of which is a permanent magnet, one of which is carried on said measuring wheel, an arm pivoted on said carriage carrying the other of said pair of magnetic members, said arm being positioned so that said pair of magnetic members can be made to coact by movement of said arm to bring said measuring wheel into zero position, a second pair of magnetic members at least one of which is a permanent magnet, one of which is carried on said dial and the other of which is carried on said carriage, a second arm pivoted on said carriage carrying pivot means for said dial, said second arm being actuated by said first arm so that when said first arm brings said first pair of magnetic members into coacting position said dial is moved with respect to said measuring wheel to disengage the gearing between said measuring wheel and said dial and said second pair of magnetic members coact to return said dial to zero position.

3. In a planimeter having the conventional pole arm, carriage, guide wheel, measuring wheel, axle, dial and tracer arm, the measuring wheel and dial being geared together by a worm and pinion gear so that the dial indicates the number of revolutions of the measuring wheel, the improvement comprising a first pair of magnetic members at least one of which is a permanent magnet, one of which is carried on said measuring wheel, an arm pivoted under said carriage carrying the other of said pair of magnetic members, said arm being positioned so that said pair of magnetic members can be made to coact by pivoting said arm, said measuring wheel being turned on said axle to bring it into zero position by the coaction of said pair of magnetic members, a second pair of magnetic members at least one of which is a permanent magnet, one of which is carried on said dial and the other of which is carried on said carriage, a second arm pivoted under said carriage carrying pivot means for said dial, a pinion gear pivoted with said dial and normally engaging a worm gear mounted on said axle with said measuring wheel, pin and slot means coupling the motions of said first and second arms so that when said first arm is brought into position so that the measuring wheel will be brought into zero position by the coaction of said first pair of magnetic members said second arm will be pivoted to disengage said pinion and worm gears and said second pair of magnetic members will coact to return said dial to zero position.

4. In a planimeter having the conventional pole arm, carriage, guide wheel, measuring wheel, dial and tracer arm, the measuring wheel and dial being geared together so that the dial indicates the number of revolutions of the measuring wheel, the improvement comprising a permanent magnet mounted on said measuring wheel, an arm pivoted on said carriage and a permanent magnet carried on said arm so that a pole of said permanent magnet carried on said arm can be brought into proximity with the unlike pole of said permanent magnet carried on said measuring wheel to bring said measuring wheel into zero position, a permanent magnet mounted on said dial, a permanent magnet mounted on said carriage, a second arm pivoted on said carriage carrying pivot means for said dial, said second arm being actuated by said first arm so that when said first arm brings the permanent magnet carried thereby into proximity with the permanent magnet carried on said measuring wheel said dial is moved with respect to said measuring wheel to disengage the gearing between said measuring wheel and said dial whereby the coaction of said permanent magnet mounted on said dial and said permanent magnet mounted on said carriage returns said dial to zero position.

5. In a planimeter having the conventional pole arm, carriage, guide wheel, measuring wheel, axle, dial and tracer arm, the measuring wheel and dial being geared together by a worm and pinion gear so that the dial indicates the number of revolutions of the measuring wheel, the improvement comprising a permanent magnet carried on said measuring wheel, an arm pivoted under said carriage and carrying another permanent magnet positioned so that a pole of said permanent magnet carried on said arm can be brought into proximity with the unlike pole of said permanent magnet carried on said measuring wheel by pivoting said arm to bring said measuring wheel into zero position, still another permanent magnet carried on said measuring wheel 180° opposite from the position of the other permanent magnet and having its magnetic poles facing in the opposite direction so that if said permanent magnet carried on said arm is brought into proximity therewith the like poles will repel each other and turn said measuring wheel toward its zero position, permanent magnetic means mounted on said dial, a permanent magnet mounted on said carriage, a second arm pivoted under said carriage carrying pivot means for said dial, a pinion gear pivoted with said dial, a worm gear mounted on said axle with said measuring wheel, said pinion gear normally engaging said worm gear, pin and slot means coupling the motions of said first and second arms so that when said first arm is brought into position so that the measuring wheel will be brought into zero position by the coaction of said permanent magnet mounted on said measuring wheel and said permanent magnet mounted on said first lever arm said second arm will be pivoted to disengage said pinion and worm gears whereby the coaction of said permanent magnetic means mounted on said dial and said permanent magnet mounted on said carriage returns said dial to zero position, said permanent magnetic means mounted on said dial including oppositely magnetized poles at the zero position and at the 180° opposite position whereby if the 180° opposite position is adjacent the permanent magnet mounted on said carriage the unlike poles will repel and turn said dial toward the zero position and resilient means urging the second arm toward said axle.

References Cited in the file of this patent

UNITED STATES PATENTS 1,600,319     Cox _____ Sept. 21, 1926

FOREIGN PATENTS

734     Great Britain _____ 1900
63,626     Austria _____ Feb. 25, 1914
811,622     Germany _____ Aug. 23, 1951

OTHER REFERENCES

Catalog, "Drafting and Tracing Reproducing Materials," Frederick Post Co., Chicago, 18th edition, 1936, pages 200–201.